May 6, 1924.
P. P. DEUTSCHMANN
CONTROLLING OF POWER ENGINES
Filed Dec. 27, 1920    2 Sheets-Sheet 1
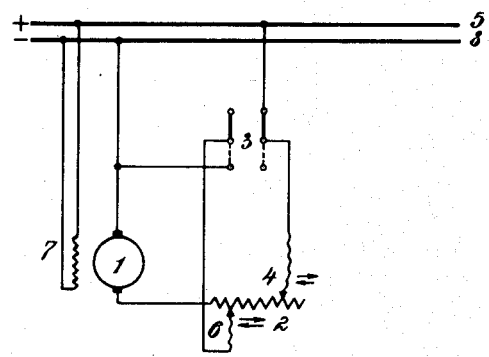
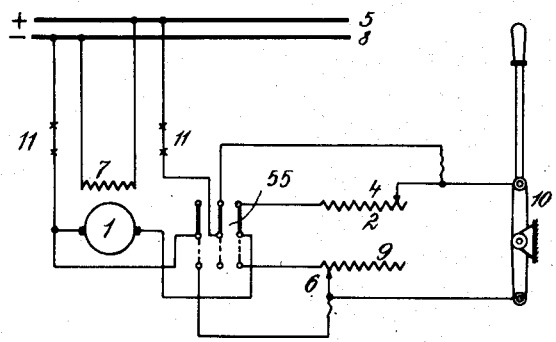
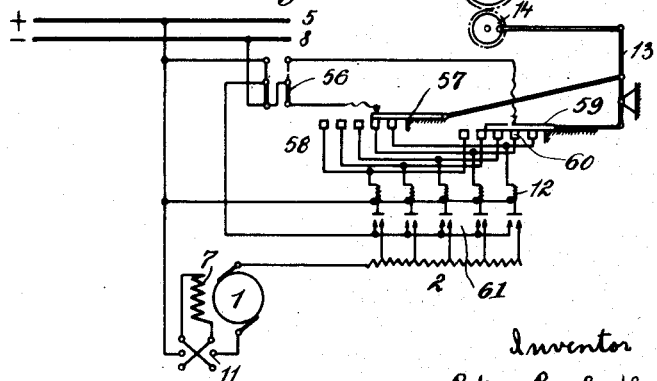
Inventor
Peter Paul Deutschmann
by Knight Bro
attorneys

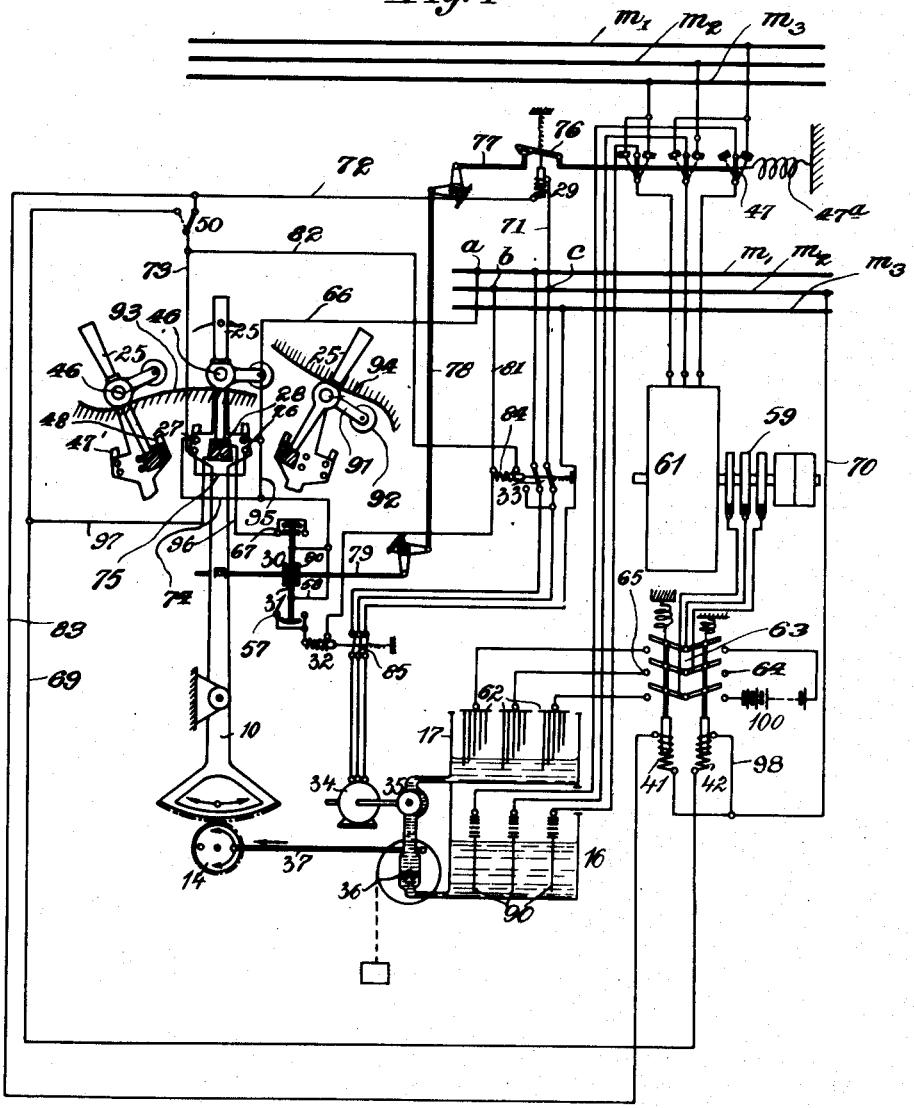
Fig. 4
Fig. 5
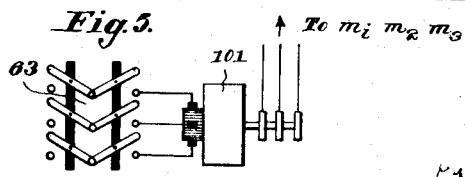

UNITED STATES PATENT OFFICE.

PETER PAUL DEUTSCHMANN, OF BERLIN-CHARLOTTENBURG, GERMANY, ASSIGNOR TO SIEMENS-SCHÜCKERTWERKE GESELLSCHAFT MIT BESCHRÄNKTER HAFTUNG, OF SIEMENSSTADT, NEAR BERLIN, GERMANY, A GERMAN CORPORATION.

CONTROLLING OF POWER ENGINES.

Application filed December 27, 1920. Serial No. 433,475.

*To all whom it may concern:*

Be it known that I, PETER PAUL DEUTSCHMANN, a citizen of the German Empire, residing at Berlin-Charlottenburg, Germany, have invented certain new and useful Improvements in the Controlling of Power Engines, of which the following is a specification.

My invention relates to a control device for electric machines having a system of connection embodying one or more resistances adapted to cause the braking period to immediately succeed the starting (speeding-up) period. In electric machines of this type, the number of revolutions of which is regulated by altering the field at constant voltage or by altering the voltage at constant field, the control member is required to execute only a slight motion in order to change over from the starting to the braking period. This very feature, however, constitutes the great advantage of control devices of this type, of which perhaps the best known is the Leonard system. When in this system, the engineer shifts the control lever out of its neutral position, the speed of the motor is accelerated and it enters the speeding-up period. If the engineer keeps the control lever in the position thus assumed, the motor will continue to run at a constant or approximately constant speed. If now the engineer pulls the control lever back from this position, say, but for a slight distance, then the motor is immediately braked and it now enters the braking period. It will thus be seen that when the movement of the control lever is reversed, the speeding-up and braking periods follow close upon each other.

However, the conditions created are entirely different whenever a motor, controlled by aid of resistances arranged in the main circuit is involved. When in this case, the control lever is shifted out of the neutral position there is likewise effected an acceleration of the motor speed in proportion to the cutting out of the resistances. If, however, the control lever be kept in any position between neutral and one of its end positions, the motor will as a rule not continue to run at a constant speed, but will adjust itself to a speed depending upon the magnitude of the load and upon the starting resistances which have not yet been cut out. Though now the engineer may draw the control lever backward so that again more resistances are thrown into circuit, yet no brake action will occur. Though the speed may then decrease, this is by no means necessarily the case. On the contrary, it is rather liable to still increase, in particular when the load has become, as it were, negative, so that it is the motor that is now being driven. Braking will then only be brought about when the control lever is pulled back entirely into its neutral position and therebeyond into the position in which the motor is started in the opposite direction, in other words when the braking is effected by means of a counter-current. It will thus be observed that in this case the speeding-up period of the motor and its brake period do not directly follow each other as the control lever is moved forward and backward, but these periods are rather separated from each other by an interval dependent upon the extent to which the control lever is shifted out of the neutral position.

During this interval, the engineer, however, no longer governs the motor by means of the control mechanism; a fact which entails a great disadvantage. For the time which elapses until the control lever has been shifted beyond the neutral and into the brake position may suffice, say, for example, in the case of hoisting engines to bring about inadmissible increase of speed or racing liable to cause accidents.

It is an object of my invention to make it possible to have the braking period directly succeed the speeding up period in all electric machines having resistances located in the load current circuit, in induction motors especially in the rotor circuit. This is accomplished in such manner that whenever the control lever is retracted from any position assumed, the braking period will immediately set in. To this particular end, use is made of the well known brake connection method, by which the motor is disconnected from the network and thrown in circuit with brake resistances.

The changing-over to the brake resistances is effected by aid of switch members actuated independently or by which the reversal is effected in dependence upon the movement of the control lever. In accordance with my invention, the brake resistances are always adjusted as required for each position into which the control lever may be shifted by the lever itself immediately as it moves out of the neutral position, so that, when changing-over occurs, these resistances at once have the correct or approximately correct value required, with the result that to a certain degree a definite control action is obtained, that is to say a definite dependency of the motor speed upon the deflection of the control lever. The aforesaid adjustment of the resistances is effected in accordance with my invention, by using the control lever not only for adjusting the elements controlling the starting resistances but simultaneously (although in an opposite sense) for adjusting the elements serving to regulate the brake resistances. At the same time, if deemed expedient, the starting and brake resistances may be disposed separately, though there is no objection to the starting resistance itself acting also as brake resistance. Besides, the control device may be so designed as to allow both, an immediate direct connection of the resistances, as also their indirect connection by means of relay controlled switches.

In the drawings affixed to this specification and forming part thereof several modifications of a system of connection embodying my invention are illustrated diagrammatically by way of example. In the drawings:—

Figs. 1 to 3 disclose three systems of connection suitable for continuous-current machines, while Fig. 4 discloses a system of connection adapted for asynchronous alternating-current motors.

Fig. 5 discloses a frequency converter which may be used to excite the motor during the braking period.

Referring to Fig. 1 1 is the armature of the motor to be controlled by the resistance 2. This latter is employed both for speeding-up as well as for braking. During the speeding-up period the double pole change-over switch 3 is thrown into the full line position, resulting in connection of the sliding contact 4 to the main 5 of the network. When braking, the change-over switch 3 is thrown into the dotted position shown in this figure. By these means, the sliding contact 4 is cut-out and sliding contact 6 thrown into circuit. During both of these running periods, the field coil 7 of the motor is permanently connected to the mains 5 and 8 of the network. In accordance with my invention, the regulating contacts 4 and 6 are moved simultaneously (though in opposite directions) by the control lever, when speeding-up in the direction denoted by the full line arrows, and when braking, in the direction denoted by the dotted arrows. If consequently the speeding-up contact 4 is shifted into its extreme right-hand end-position, the regulating contact 6 is shifted into its extreme left-hand end-position. This is the position assumed by the contacts when the motor starts. By the time the motor has attained full speed, contact 4 has reached the extreme left-hand position and contact 6 the extreme right-hand position. If now switch 3 is turned downward, then the brake period of the motor immediately commences whereby the full value of resistance 2 is at first connected into the brake circuit. When the control lever is then gradually shifted back, contact 6 moves in the direction indicated by the dotted arrow and thus gradually cuts out the brake resistance. Hence the motor is braked by the resistance and will come to a stop as soon as contact 6 has been moved into the extreme left-hand position. In this contingency the brake energy is absorbed by the resistance.

The method of actuating the two regulating contacts 4 and 6 through the control lever 10 is disclosed by Fig. 2. One of these contacts is connected above and the other below the lever fulcrum, so that they perform motions in opposite direction. The system of connection according to Fig. 2 corresponds in its essentials with that shown in Fig. 1, except that separate resistances are employed for speeding-up and for braking, namely the speeding-up resistance 2 and the brake resistance 9. Accordingly switch 55 corresponding to switch 3 in Fig. 1 is tri-polar. The numerals 11 denote the change-over switches for the armature circuit of the motor, which may be connected, in a manner known to the art (but not shown), by the control lever.

Fig. 3 discloses a control device embodying relay controlled switches, and in which use is likewise made of a combined speeding-up and braking resistance 2 as shown in Fig. 1. The relays 12 are energized when contact bars 57 and 59 operated by lever 13 slide over their respective contacts 58 and 60. Thereby relay contacts 61 are successively closed and thus gradually short circuit resistance 2. Both contact bars 57 and 59 are actuated in opposite direction by lever 13, connected by a crank disk 14 to the hand control lever 10. The reversing to either speeding-up or braking is effected by means of a change-over switch 56 adapted to throw either bar 57 or 59 into circuit and also adapted to either throw the armature circuit of the motor into the network of the system or to short-circuit it over more or less resistance. The motor illustrated being a series motor, the previously mentioned operation constitutes the beginning of the braking period. The numerals 11 denote a change-over switch and 7 the field of the motor both referred to hereinbefore. It will thus be seen that switch 56 is the element serving to reverse the motor from speeding-up to braking. If it be desired to actuate this switch by the control lever 10, this may be accomplished in the customary manner (not shown here) with the aid of a drag brake or the like, adapted to throw the switch when the control lever reverses its movement.

Fig. 4 illustrates my invention as applied to an asynchronous three-phase motor 61, which is supplied with current from the mains $m_1$, $m_2$, $m_3$. The motor may be connected by means of switch 47 either with the mains $m_1$, $m_2$, $m_3$ or with the electrodes 90 of a liquid brake resistance which is disposed in the tank 16. The slip rings 59 of the motor may be connected with the electrode 62 of a liquid resistance contained in tank 17, or with the battery 100. For this purpose serves a switch 63 which may be thrown either to the contacts 65 or 64. For the starting period, this motor is connected with the mains $m_1$, $m_2$, $m_3$ through the starting resistance 62, whereas for the braking period it is connected with the braking resistance 90 and the battery 100. It is thereby assumed that the braking period should immediately succeed the starting period.

The value of the two resistances is variable. For this purpose a pump 35 is provided which elevates and lowers the electrolyte in the tanks 16 and 17. This pump is arranged between tanks 16 and 17 in such manner that the liquid is transferred from one tank into the other. The pump is driven by a motor 34 which can be thrown in and out of circuit by means of switch 85, whereby the direction of rotation of the pump is controlled by switch 33. In the conduits of the pump and between the two tanks 16 and 17 a valve 36 is provided which can be adjusted by the main control lever 10 by means of a gear wheel 14 and connecting rod 37 in such manner that it is closed when lever 10 stands in its middle position and that it is full open in the two extreme end positions of lever 10.

The control lever 10 is connected with switch 47 by means of rods 79, 78 and 77 in such manner that this switch is operated on its contacts when lever 10 is operated. However, connection between switch 47 and lever 10 is established only when the coupling link 76 actuated by the minimum relay 29 connects rod 77 with the switch. A tension compression switch 47ᵃ is provided which tends to hold switch 47 in central position when it is disconnected from the lever gear. The handle 25 of lever 10 is pivoted on a boss 46 so that it may be individually tilted a certain amount relatively to the central axis of lever 10 for the purpose of closing contact pairs 26, 27, 28, in its various angular positions relatively to lever 10, so that this handle together with lever 10 constitutes a switch gear by itself. The throw of handle 25 is, however, limited: firstly by means of two stops 47' and 48; and secondly, it is limited in the several positions of lever 10 other than central position by means of an arm 91 attached to handle 25 which carries at its outer end a roller 92. As will be noted from Fig. 4, two fixed cam surfaces 93 and 94 are provided, on the frame of the entire switch gear, in the path of roller 92 by which the movements of handle 25 are limited for certain positions of lever 10 as will be presently explained. Preliminarily it may be stated that when handle 25 is in its central position, i. e. in axial alinement with lever 10 it is yieldingly held in this central positon by suitable centering means, such as springs (not shown) by which the handle is prevented from accidentally tilting on lever 10, but which means permit its being angularly tilted without thereby actuating lever 10.

If it is now desired to throw lever 10 by means of handle 25 from its central neutral position to one or the other of its lateral positions, handle 25 is first tilted on its pivot 46 until it abuts against stop 47' or 48, and only then lever 10 will be taken along. On the other hand, if lever 10 appears to be in one of its positions other than the central or neutral position, and it is desired to return lever 10 to normal, handle 25 would first tend to return to its central position. Since, however, roller 92 will in that case abut against cam surfaces 93 or 94, handle 25 cannot be turned beyond its central position, so that lever 10 is pulled into neutral position with handle 25 in axial alinement with it.

Rod 79 of the main switch gear previously described is provided with a double detent 80 operatively connected with the two switches 30 and 31 as shown. In the neutral position of lever 10 these two switches are in their central position as shown. In the lateral positions of lever 10, these switches are thrown in one or the other direction and respectively close contacts 57 and 67.

The contacts which are thus controlled by the movements of lever 10 and handle 25 are located in circuits controlling the operation of the switches 63, 85 and 33 and minimum relay 29 which latter controls the mechanical coupling between main switch 47 and rod 77 as previously described. The control circuit by which switch 63 is operated in order to be thrown onto contact 65 includes point $a$ of main $m_1$, conductor 66, contacts 26 and conductor 75, (or conductor 74 and contacts 27), conductor 73, switch 50, conductor 83, relay 41, conductor 70, the point d of main $m_2$.

The control circuit which throws switch 63 onto contacts 64 runs as follows: From point a of main $m_1$ over conductor 66, 95, 69, 68, the lever of switch 30, one of the contacts 67 of the switch, conductor 96, contacts 28, conductors 97 and 69, relay 42, conductors 98 and 70, to point d of main $m_2$.

The control circuit for switch 85 runs from point a of main $m_1$ over conductors 66, 69, 58, switch 31, one of the contacts 57, relay 32, conductor 81, to point b of main $m_3$.

The control circuit for change-over switch 33 runs from point a of main $m_1$ by way of conductor 66, and by way of conductor 74 and contacts 27 (or 26 and conductor 75), conductor 73 and 82, relay 84, to point b of main $m_2$.

The control circuit for relay 29 runs similar to the circuit for relay switch 33 last traced up to conductor 73, where it then branches off to switch 50, conductor 72, relay 29, conductor 71 to point c of main $m_2$.

The entire circuit control device operates as follows: In the normal central position of lever 10 all control circuits are interrupted. Switch 47 stands in its middle position and thus motor 61 is connected with its stator winding to brake resistance 90 and the rotor circuit is open. If now lever 10 is thrown by means of handle 25 into one or the other lateral positions, first handle 25 is rocked and thrown out of alinement with lever 10. Thereby the circuit through the minimum relay 29 is closed and thus main switch 47 mechanically coupled with lever 10. At the same time, the circuit through relay 41 of switch 63 is closed at the contacts 26 or 27, and thus switch 63 is actuated and connects the motor armature with the starting resistances 62. Besides at the same time, the control circuit for switch 85 of the pump motor 34 is set at the contacts 26 or 27, but it still remains open at contacts 31. At the same time also the energizing circuit of switch 33 is closed so that this switch is actuated. If now, after handle 25 has thus been tilted, lever 10 is moved from its central postion, main switch 47 is thrown into one of its lateral positions, the stator of motor 61 is thereby disconnected from the brake resistance 90 and connected with the mains $m_1$, $m_2$, $m_3$, and thus receives current. The motor 61 will then start to run in a certain direction. With such shifting of lever 10, also switch 31 is closed in the manner described hereinbefore, and thus the control circuit through switch 85 of the circuit, supplying pump motor 34 with current, is closed. Pump 35 now commences to operate and forces the electrolyte from tank 16 into tank 17 (valve 36 having been opened in the meantime through the operation of lever 10 as previously described). By this transfer of electrolyte, the starting resistance in tank 17 is thus gradually diminished, and motor 61 gradually increases its speed.

If it is now desired to brake the motor, the operator throws handle 25 in the opposite direction. By this operation the handle is first straightened out and thrown into alinement with its lever 10 and it is held in this position by the cam surfaces 93 or 94 and by its roller 92 as previously described. This straightening of handle 25 opens either contacts 26 or 27 and closes contacts 28.

By opening contacts 26 or 27, the control circuits through the minimum relay 29, switch 63 and switch 33 are opened, the minimum relay 29 is thus deenergized and switch 63 is opened at 65. Thus main switch 47 becomes mechanically disconnected from the lever gear and return automatically into its central position by the action of the tension compression spring 47ᵃ. By this operation the stator of motor 61 is disconnected from the mains and thrown back onto brake resistance 90. The rotor of motor 61 is at the same time disconnected from the starting resistance 62, switch 63 is returned to normal position as shown and thereby the pump motor 34 is connected so that it runs in the opposite direction.

By closing contacts 28, the circuit through relay 42 of switch 63 is closed, because with lever 10 still in off-normal position, switch 30 is still closed. When relay 42 is thus energized, switch 63 closes the contact 64 and thus throws the rotor armature in circuit with the battery 100. Switch 85 which controls pump motor 34 still remains closed, because the control circuit of relay 32 which actuates that switch depends entirely on the position of switch 31 which is also still closed with lever 10 still in off-normal position.

The motor 61 is thus at this moment entirely disconnected from the mains, its rotor is supplied from battery 100 with direct current and the current generated in the stator flows through brake resistance 90. Pump 35 now running in opposite direction draws the electrolyte from tank 17 and pumps it into tank 16, so that the brake resistance is gradually decreased and the braking increased.

If now lever 10 is returned into its central neutral position, switches 30 and 31 are mechanically opened by rod 79, so that also the control circuits for relay 42, which operates switch 63 and the circuit controlling relay 32 of switch 85, are opened. Thus relays 42 and 32 become deenergized and the rotor is disconnected from battery 100 and the pump motor is disconnected by the opening of switch 85 and the pump stops operating.

It thus appears that by the return motion of handle 25 tending to throw lever 10 from any of its lateral positions back to normal position, a brake connection is established by which the motor 61 is always completely disconnected from the supply mains, and whereby the braking period immediately follows the starting period. At the same time, by the particular opposite variation of the resistances 62 and 90 for each reverse motion of the handle, a brake resistance is produced which fits the particular speed. Through the valve 36 the rate of flow of the electrolyte is controlled in such manner that it does not flow too fast into tank 17 during the starting period and thus the reduction of the starting resistance at too high a rate of speed is avoided.

It will thus be seen that when running for test or inspection purposes or for slowly hoisting bulky goods, the possibility is given for running with the aid of a countercurrent. Still it will prove more advisable to operate by means of rotor excitation and with the help of resistances inserted into the stator circuit, because in that case any desired lowering speed may be accurately maintained. Besides no additional brake resistances will be required, and lastly none of the energy derived from the network will be wasted. In order to achieve this object in a very simple manner by the control lever and by the execution of exactly the same manipulations as when hoisting or lowering a load directly by action of the network, it is only necessary to use a change-over switch 50 provided for this purpose in the control circuit as shown in Fig. 4. This switch will be thrown into the dotted position before carrying out the above operation. As a result, no control current can pass through the relay 29 of the stator reversing switch or through the rotor switch control relay 41 by which the rotor is connected to resistances 62; on the other hand, while the control lever 10 is yet in the neutral position and while the handle 25 of this lever is already rocked into one of its extreme positions, the rotor is already connected to the continuous-current supply 100, the relay receiving its current over the switch 50. Likewise when the control lever 10 is shifted into one of its end-positions, the communication between the rotor and the continuous-current circuit will be maintained.

The farther the lever is shifted outwardly the greater will be the braking resistance and therefore the lowering speed. In this case, too, stopping is effected simply by retracting the control lever. The handle 28 is then rocked back and the relay 42 receives its current over the switch 30 and the contacts 28 as in the case previously described. The brake resistance is lessened, the brake effect increased and the lowering speed reduced. The liquid braking resistance is regulated as previously described, the pump motor getting reversed when the handle of the control lever 10 is thrown over into the neutral position.

As illustrated in Fig. 4, the motor is connected to a continuous-current battery 100. However, in the place of a source of continuous current, use may also be made of a source of alternating current, in which case the motor is, for example, excited across a frequency converter 101 during the braking period, as indicated in Fig. 5.

I claim:—

1. A control device for electric motors having a control resistance located in their main circuit, said device comprising a hand control lever and motor control circuits connected therewith and means on said lever for setting said circuits to connect said motor to the current supply during its speeding-up period, and to connect it to said resistance only during the braking period.

2. A control device for electric motors having a control resistance located in the main motor circuit, said device comprising a hand control lever and two resistance control members connected therewith and acting in opposite sense upon said resistance, and a switch for connecting one or the other of said resistance control members into circuit, according to the direction in which said lever is shifted.

3. A control device for electric motors having a control resistance located in the main motor circuit, said device comprising a hand control lever and two resistance control members connected therewith and acting in opposite sense upon said resistance, and a switch controlled by the movement of said lever for connecting one or the other of said resistance control members into circuit according to the direction in which said lever is shifted.

4. A control device for electric motors having a liquid starting resistance for the motor and a liquid braking resistance for the motor, said device comprising a hand control lever and auxiliary circuits connected therewith and controlled by its movement for causing the transfer of electrolyte to the starting resistance when the lever is shifted into the starting position and causing the transfer of said electrolyte to the braking resistance when the lever is shifted into the braking position.

5. A control device for electric motors having a liquid starting resistance for the motor and a liquid braking resistance for the motor, said device comprising a hand control lever and auxiliary circuits controlled by the lever handle and by the shifting of the lever itself for causing the transfer of electrolyte to the starting resistance when the lever is shifted into the starting position and causing the transfer of said electrolyte to the braking resistance when the lever is shifted into the braking position.

6. A control device for electric motors having a starting resistance and a braking resistance for the motor, said device comprising a hand control lever and electric circuit connections controlled by said lever causing the cutting-out of the main current supply and the switching-over of said motor from the starting resistance to the braking resistance, whenever the hand lever is about to be reversed from a speeding period position.

7. A control device for electric motors having a starting resistance and a braking resistance for the motor, said device comprising a hand control lever, means for changing the two resistances in opposite sense, and electric circuit connections controlled by said lever causing the cutting-out of the main current supply and the switching-over of said motor from the starting resistance to the braking resistance, whenever the hand lever is about to be reversed from a speeding period position.

8. A control device for electric motors having a starting resistance and a braking resistance for the motor, said device comprising a hand control lever, a switching device on said lever and auxiliary circuits controlled by said switching device causing the cutting-out of the main current supply and the switching over of said motor from the starting resistance to the braking resistance, whenever the hand lever is about to be reversed from a speeding period position.

9. A control device for electric motors having a starting resistance and a braking resistance for the motor, said device comprising a hand controlled lever, a movable lever handle and a switching device controlled by said lever handle and auxiliary circuits controlled by said switching device for causing the cutting-out of the main current supply and the switching-over of said motor from the starting resistance to the braking resistance whenever the hand lever is about to be reversed from a speeding-up period position.

10. A control device for electric motors having a starting resistance and a braking resistance for the motor, said device comprising a hand control lever, a switching device on said lever, auxiliary circuits controlled by said switching device causing the cutting-out of the main current supply and the switching over of said motor from the starting resistance to the braking resistance, whenever the hand lever is about to be reversed from a speeding period position, and a switch (50) arranged in the auxiliary circuits and adapted to cut off the main current supply and the starting resistance.

In testimony whereof I affix my signature.

PETER PAUL DEUTSCHMANN.